United States Patent [19]

Maruyama et al.

[11] Patent Number: 4,848,038
[45] Date of Patent: Jul. 18, 1989

[54] METHOD FOR GRINDING A NON-CIRCULAR WORKPIECE

[75] Inventors: Toshio Maruyama, Kariya; Hiroshi Nakano, Toyoda; Yasuji Sakakibara, Hekinan, all of Japan

[73] Assignee: Toyoda-Koki Kabushiki-Kaisha, Kariya, Japan

[21] Appl. No.: 100,349

[22] Filed: Sep. 23, 1987

[30] Foreign Application Priority Data

Sep. 24, 1986 [JP] Japan .................. 61-226523

[51] Int. Cl.$^4$ .............................................. B24B 1/00
[52] U.S. Cl. ........................... 51/281 C; 51/165.71; 51/105 EC; 364/474.06
[58] Field of Search ............. 51/281 C, 326, 97 MC, 51/105 EC, 281 P, 165 TP, 165.71, 165.74; 364/474, 474.06; 409/104, 132; 82/18

[56] References Cited

U.S. PATENT DOCUMENTS

| | | | |
|---|---|---|---|
| 3,344,559 | 10/1967 | Inaba et al. | 51/105 |
| 3,482,357 | 12/1969 | Inaba et al. | 51/105 R |
| 4,214,309 | 7/1980 | Koide et al. | 51/97 NC X |
| 4,400,781 | 8/1983 | Hotta et al. | 51/165.71 X |
| 4,443,976 | 4/1984 | Kaiser, Jr. | 51/101 R |
| 4,528,781 | 7/1985 | Koide et al. | 51/281 C |
| 4,557,076 | 12/1985 | Helbrecht | 51/165.71 |
| 4,621,463 | 11/1986 | Komatsu et al. | 51/281 C |
| 4,747,236 | 5/1988 | Wedeniwski | 51/281 C |

FOREIGN PATENT DOCUMENTS

| | | | |
|---|---|---|---|
| 53-148782 | 12/1978 | Japan | 51/165 R |
| 54-68589 | 6/1979 | Japan | 51/165 R |
| 55-125973 | 9/1980 | Japan | 51/165 R |
| 0114660 | 9/1981 | Japan | 51/97 NC |
| 60-263213 | 12/1985 | Japan | 51/165 R |
| 60-263214 | 12/1985 | Japan | 51/165 R |
| 0270065 | 11/1986 | Japan | 51/97 NC |

*Primary Examiner*—Frederick R. Schmidt
*Assistant Examiner*—Shirish Desai
*Attorney, Agent, or Firm*—Oblon, Spivak, McClelland, Maier & Neustadt

[57] ABSTRACT

A grinding method for grinding non-circular workpiece such as a cam. The grinding wheel is moved according to the profile data defining profile generating movement of grinding wheel and cut-in feed data defining cut-in feed movement of the grinding wheel. In a part of each revolution of the workpiece, where the acceleration of the profile generating movement become zero or a negative value, the profile generating movement according to the profile data and the cut-in feed movement according to the cut-in feed data are executed simultaneously. Then, in the remainder of each revolution, the profile generating movement is executed without cut-in feed. The above-mentioned process is repeated alternately until the total amount of cut-in feed reaches a predetermined value.

3 Claims, 9 Drawing Sheets

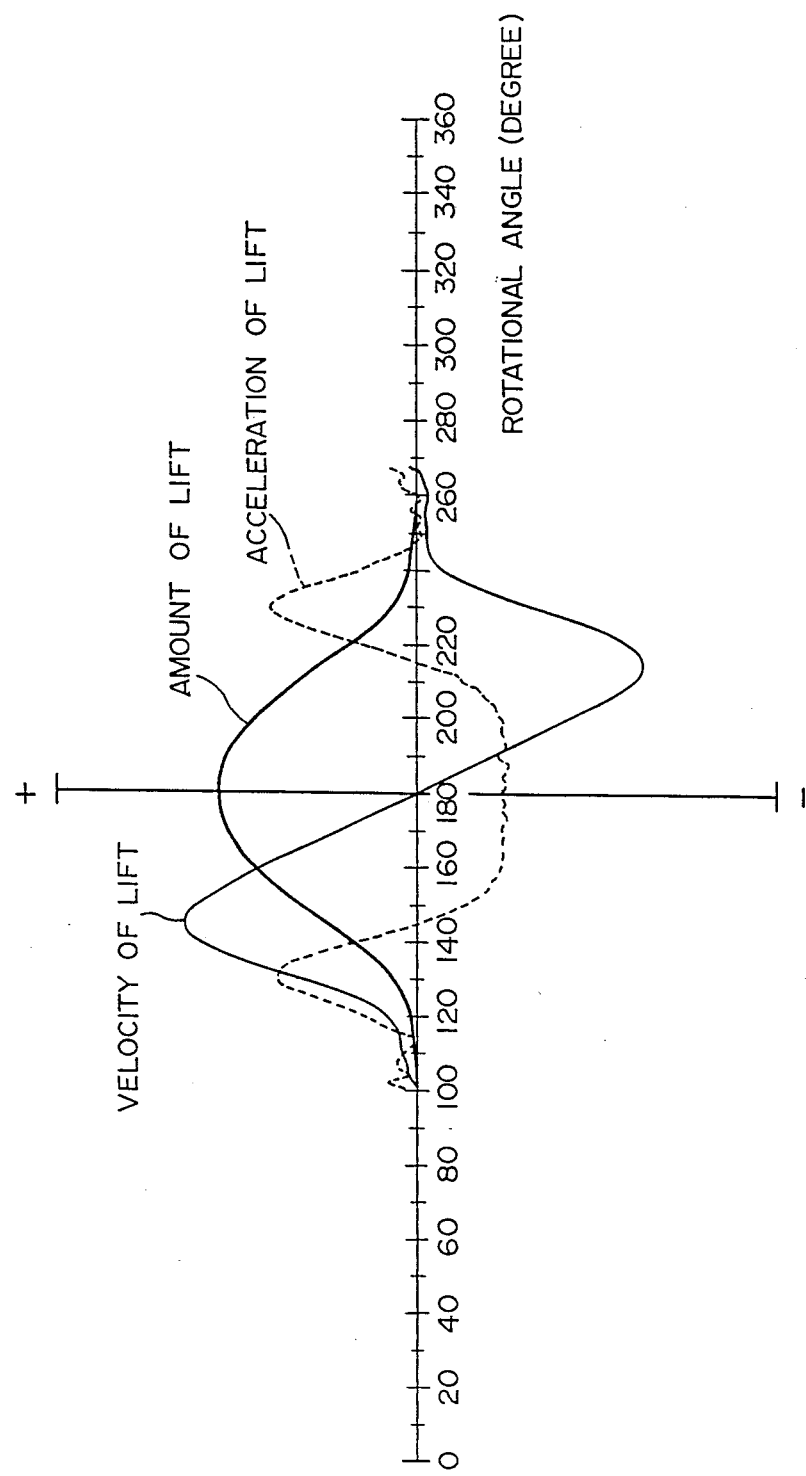

METHOD FOR GRINDING A NON-CIRCULAR WORKPIECE

BACKGROUND OF THE INVENTION

1. Field of the Invention

The present invention relates to a method for grinding a non-circular workpiece such as a cam shaft with a numerically controlled grinding machine.

2. Description of the Prior Art

Generally, in a numerically controlled grinding machine for grinding a non-circular workpiece, the feed of the grinding wheel perpendicular to a spindle axis is controlled according to profile data and machining cycle data.

The profile data comprises the amount of movement of the grinding wheel per unit angle rotation of the spindle which defines the profile generating movement of the grinding wheel along the finished shape of the workpiece. On the other hand, the machining cycle data comprises a numerical control program to control a machining cycle which includes rapid feed, cut-in feed and retracting feed of the grinding wheel. Workpieces are ground by the profile generating movement according to the profile data and the cut-in feed according to the machining cycle data.

In the grinding machine of the aforementioned type, the time relation between the cut-in feed and the profile generation movement of the grinding wheel is very important for desirable grinding accuracy and grinding speed.

In a prior grinding method, rotation of the main spindle is stopped during cut-in feed. Namely, the profile generating movement and the cut-in feed of grinding wheel are executed alternately. For example, the profile generating movement is stopped at a original angle position where the grinding point of the workpiece moves to the center of the base portion of the cam. Then, the grinding wheel is fed to the workpiece by a predetermined cut-in feed amount. After completing cut-in feed, the profile generating movement is resumed. The above-mentioned process is successively repeated.

In such grinding method, there are problems which occur regarding grinding speed and grinding accuracy. Namely, since the main spindle is stopped for cut-in feed during each rotation of the main spindle, the grinding speed is decreased. Furthermore, since the amount of deflection of the workpiece changes slightly between the process of cut-in feed and the process of profile generating movement due to stopping of the main spindle, a step is produced at the center of the base portion of the cam. Accordingly, in the prior grinding method, it is necessary to execute spark-out grinding for a long period of time so as to eliminate the step of the base portion.

In another prior method, the profile generating movement and the cut-in feed are executed simultaneously. Namely, the cut-in feed occurs continuously while the profile generation movement is executed. In such method, the grinding point of the workpiece is moved along a path of spiral shape. Accordingly, a large amount of the non-ground portion, the thickness of which is decreased in proportion to increase of rotational angle, remains when the cut-in feed is completed. Thus, it is necessary to execute spark-out grinding while the main spindle rotates more than one revolution after finishing cut-in feed.

Since a long period of spark-out grinding is needed in above-mentioned grinding methods, it takes a long time to grind the workpiece precisely. In the case of grinding a plurality of cam shafts which have a plurality of cams, such becomes a serious problem.

SUMMARY OF THE INVENTION

Accordingly, it is a primary object of the present invention to provide an improved grinding method for grinding non-circular workpiece capable of increasing grinding accuracy and grinding speed.

Briefly, according to the present invention, there is provided a grinding method for grinding a non-circular shaped workpiece such as a cam. The grinding wheel is moved according to the profile data calculated from the final shape of the workpiece and defining profile generating movement of the grinding wheel, and the cut-in feed data defining cut-in feed movement of the grinding wheel. In a part of each revolution of the workpiece, the profile generating movement according to the profile data and cut-in feed are executed simultaneously. Then, in the remainder of each revolution of the workpiece, the profile generation movement is executed without the cut-in feed. The above-mentioned process is repeated alternately until the total amount of the cut-in feed reaches a predetermined value.

In this grinding method, there is no possibility of producing a step on the surface of the workpiece because the main spindle is not stopped during grinding operation. Furthermore, it is possible to reduce the non-ground portion due to simultaneous execution of the profile generating movement and the cut-in feed. Accordingly, spark-out grinding can be reduced so as to shorten the machining time required.

According to another aspect of the invention, the cut-in feed of the grinding wheel is executed within a part of each rotation of the workpiece where the acceleration of the profile generating movement of the grinding wheel becomes zero or a negative value. By executing cut-in feed within such angular position, grinding accuracy is improved.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, in which:

FIG. 8 is an explanatory chart which explains the amount of change of the lift, velocity of the lift, and acceleration of the lift.

DESCRIPTION OF THE PREFERRED EMBODIMENT

Figure 1:
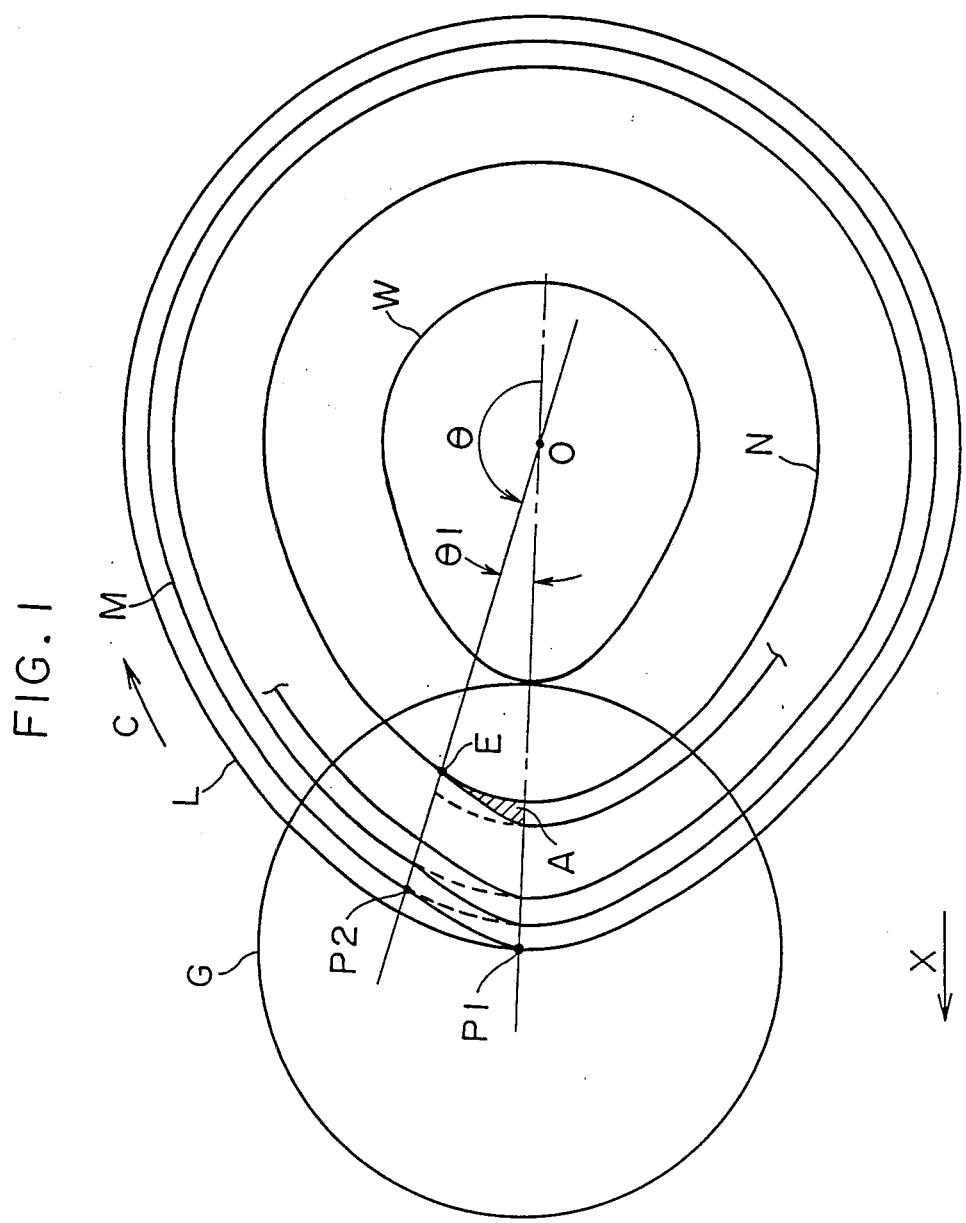
FIG. 1 is an explanatory chart which explains the grinding method according to the present invention.

Referring now to the drawings and particularly, to FIG. 1, thereof, a grinding method is illustrated for grinding a workpiece W which is rotated about the main spindle axis 0 with a grinding wheel G. The grinding wheel G is moved toward and away from the workpiece W along the X axis synchronously with the rotation of the main spindle which is rotated to the direction $\theta$. Accordingly, the grinding wheel G is moved relative to the direction C about the workpiece W. L indicates the initial locus of the center of the grinding wheel G when the profile generating movement is executed.

In the method according to the present invention, the profile generating movement is executed continuously, and the cut-in feed is added to the profile generating movement at a part of each revolution of the workpiece W without stopping the main spindle. Namely, the grinding wheel G is moved by cut-in feed from a point P1 on a initial locus L to a point P2 on a inner locus M during the rotational section $\theta_1$ of the workpiece W. During such cut-in feed, the profile generating movement and the cut-in feed are executed simultaneously. Then, the grinding wheel is moved along the inner locus M by the profile generating movement without the cut-in feed. The above-mentioned cut-in feed is executed repeatedly as shown in FIG. 1. Since the cut-in feed is executed within a narrow area, the non-ground portion of the workpiece after the above-mentioned grinding, which is proportional to the area A shown in FIG. 1, becomes a small amount. Theoretically, such non-ground portion can be eliminated by extending the movement of the grinding wheel along the final locus N to the point E which corresponds to the end of the rotational section $\theta_1$. Practically, the non-ground portion is ground by spark-out grinding after the above-mentioned grinding. Since the amount of the non-ground portion is small, the non-ground portion can be eliminated by very short spark-out grinding.

It is to be particularly noted that the machining accuracy can be improved by executing the cut-in feed within an area such as top portion of cam where the acceleration of profile generating movement becomes zero or a negative value. Namely, if cut-in feed is executed when the grinding wheel is accelerated, the follow delay of the grinding wheel, which causes inaccuracy of positioning, is increased. Thus, it is necessary for accurate grinding to execute cut-in feed within a predetermined angle section where the acceleration of the profile generating movement becomes zero or a negative value.

FIG. 8 shows the amount of lift of a finished cam, the velocity of the lift and the acceleration of the lift. The velocity of the lift is calculated by differentiating the amount of the lift and the acceleration of the lift is calculated by differentiating the velocity of the lift. The profile generation movement of the grinding wheel G is determined according to the amount of lift, and the acceleration of the profile generation movement is proportional to the acceleration of the lift. By experimentation it is ascertained that the machining accuracy is improved by executing the cut-in feed within an angle section where the acceleration of the lift becomes zero or a negative value (i.e.: the acceleration of the profile generating movement becomes zero or a negative value).

Figure 2:
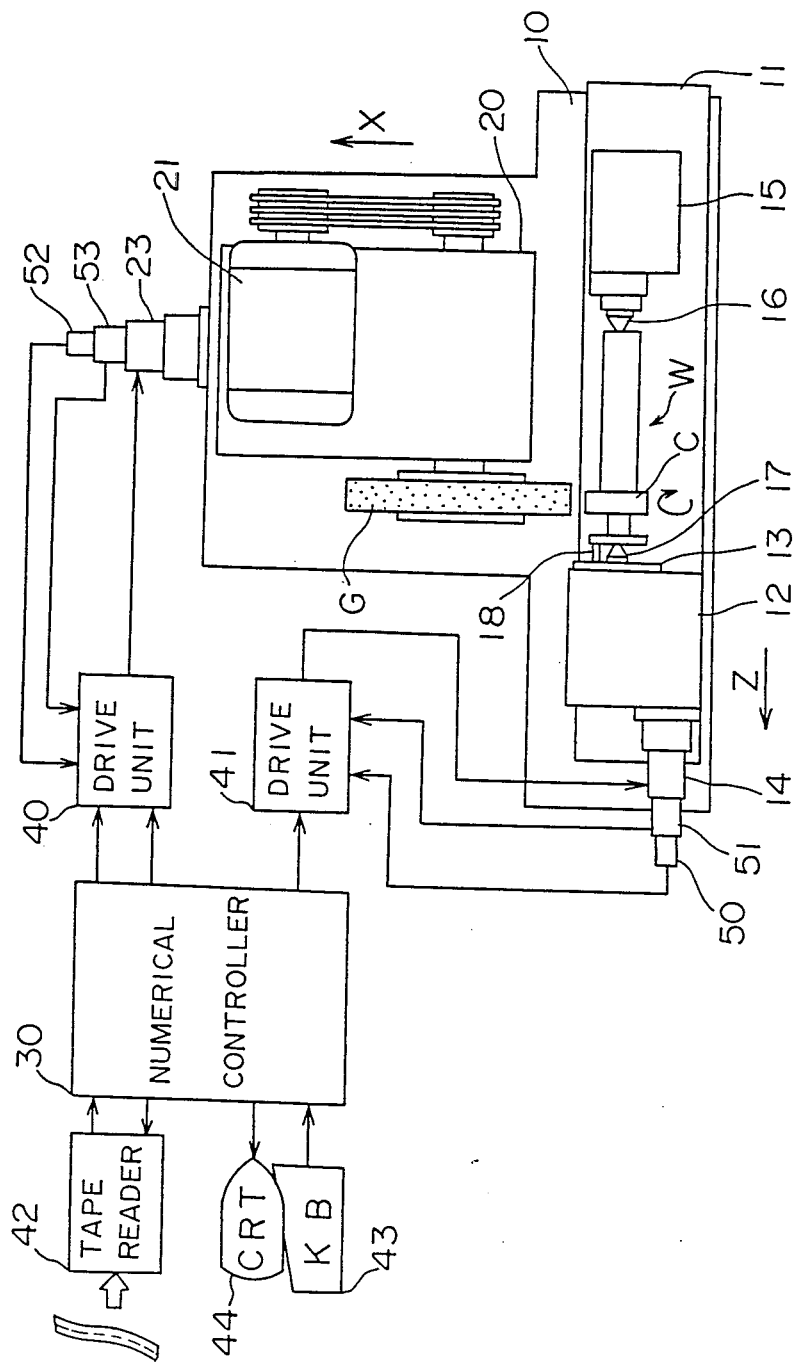
FIG. 2 is a schematic view of a numerically controlled grinding machine capable of grinding a non-circular workpiece by the grinding method according to the present invention.

A numerically controlled grinding machine capable of grinding a cam by the above-mentioned method is described hereinbelow. Referring now to FIG. 2, a numerically controlled grinding machine is shown comprising a bed 10, on which a table 11 is slidably guided along a Z axis which is parallel to a main spindle 13. A workhead 12 mounted on the left-hand end of the table 11. The workhead 12 has rotatably carried therein the main spindle 13, which is connected to a servomotor 14 so as to be rotated thereby. A tail stock 15 is also mounted on the right-hand end of the table 11. A workpiece W having cam C is carried between the center 17 of the main spindle 13 and the center 16 of the tail stock 15. The left end of the workpiece W is engaged with a positioning pin 18, which is fixed on the main spindle 13, so as to synchronize the phase of the workpiece W with the phase of the main spindle 13.

A tool slide 20 is slidably guided on a rear portion of the bed 11 for movement toward and away from the workpiece W along an X axis. A grinding wheel G, rotatably supported as a tool on the tool slide 20, is rotated by a motor 21. The tool slide 20 is connected to a servomotor 23 through a feed screw (not shown) so that advancing and retraction movement of the tool slide 20 is effected by the servomotor 23.

Drive units 40, 41 are circuits to drive servomotor 23, 14, respectively, in response to command pulses, which are generated by the numerical controller 30.

The numerical controller 30 controls the rotation of the servomotor 23, 14 numerically so as to grind the workpiece W. A tape reader 42 for inputting profile data and machining cycle data, a keyboard 43 for inputting control data and a CRT display device 44 for displaying various information are connected to the numerical controller 30.

Figure 3:
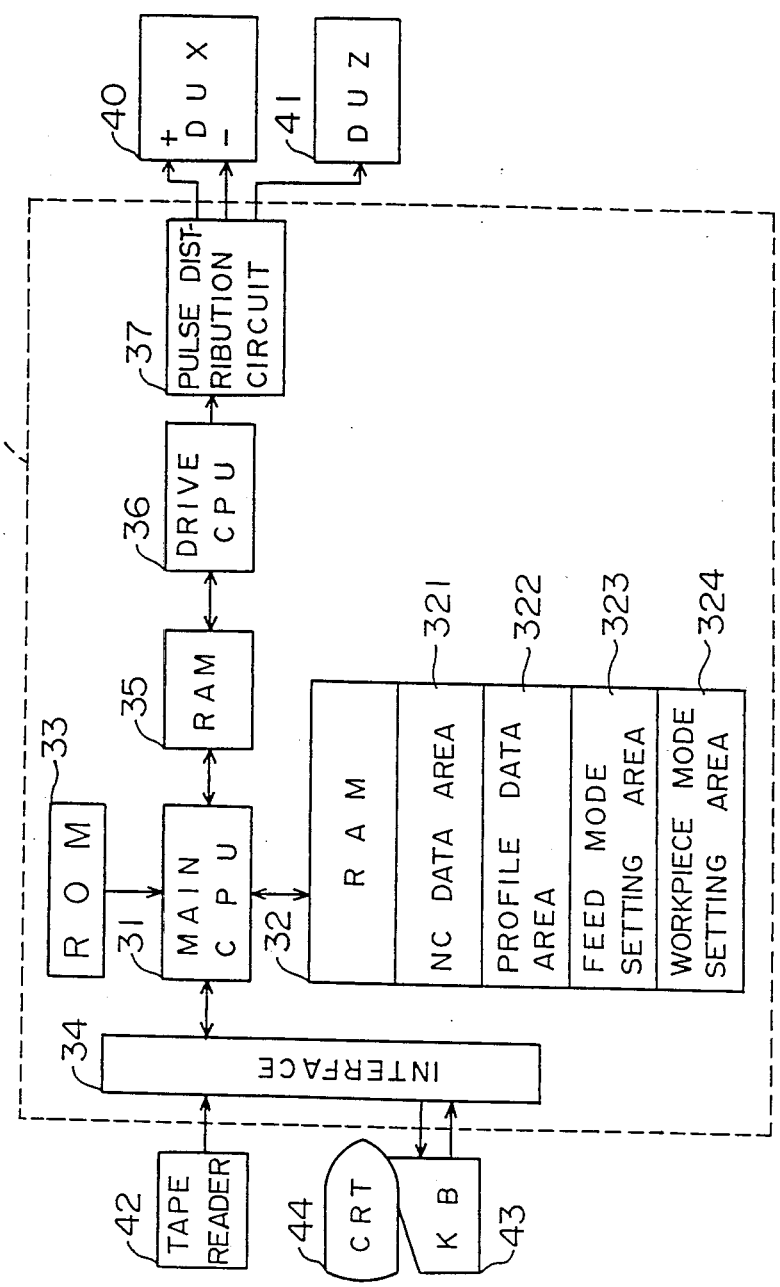
FIG. 3 is a block diagram showing the structure of the numerical controller 30 shown in FIG. 1.

The numerical controller 30 comprises a main central processing unit (hereafter referred to a "main CPU") 31, a read only memory (ROM) 33, in which control program is stored, a random access memory (RAM) 32 and an interface 34 as shown in FIG. 3. In the RAM 32, there is a NC data area 321 for storing numerical control programs and a profile data area 322 for storing profile data calculated from the ideal final shape of the workpiece. The RAM 32 also has a feed mode setting area 323 and a workpiece mode setting area 324.

The numerical controller 30 also comprises a drive CPU 36, a RAM 35 and a pulse distribution circuit 37 so as to distribute command pulse to drive units 40, 41. The RAM 35 stores positioning data sent from main CPU 31. The drive CPU 36 executes calculations for slow up, slow down and interpolation depending on the positioning data sent from the main CPU 31 via the RAM 35, and outputs the amount of movement data and velocity data at a predetermined interval. The pulse distribution circuit 37 distributes feed command pulses to drive units 40, 41 according to the amount of movement data and velocity data.

Operation of the numerical controller 30 is described hereinbelow.

Figure 4:
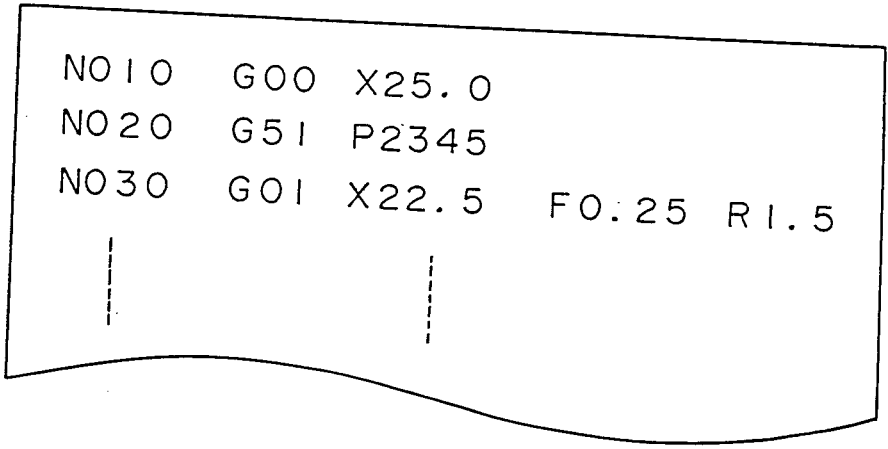
FIG. 4 shows a numerical control program for machining a workpiece.

Before grinding operation, an operator inputs an NC program shown in FIG. 4 in the NC data area 321 of RAM 32 via keyboard 43 or tape reader 42.

Figure 5A:
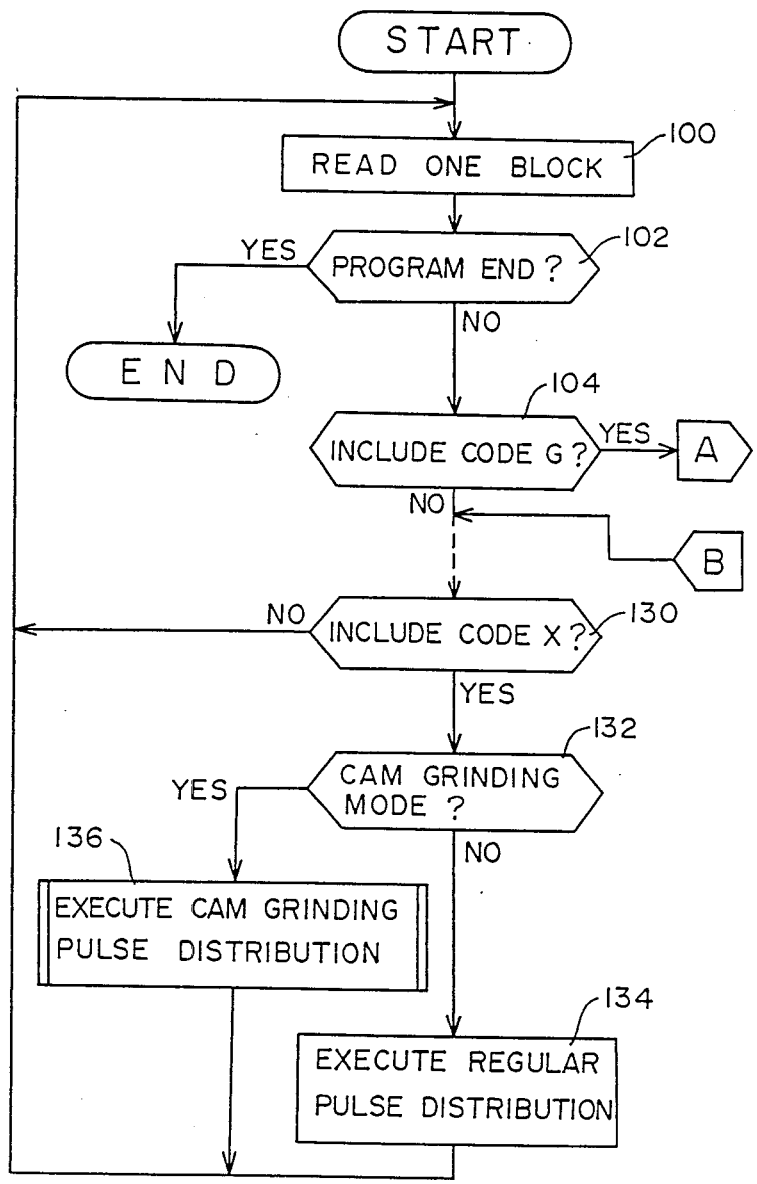
FIGS. 5(a) and 5(b) are flow charts explaining the general operation and the main CPU 31 shown in FIG. 3.
Figure 5B:
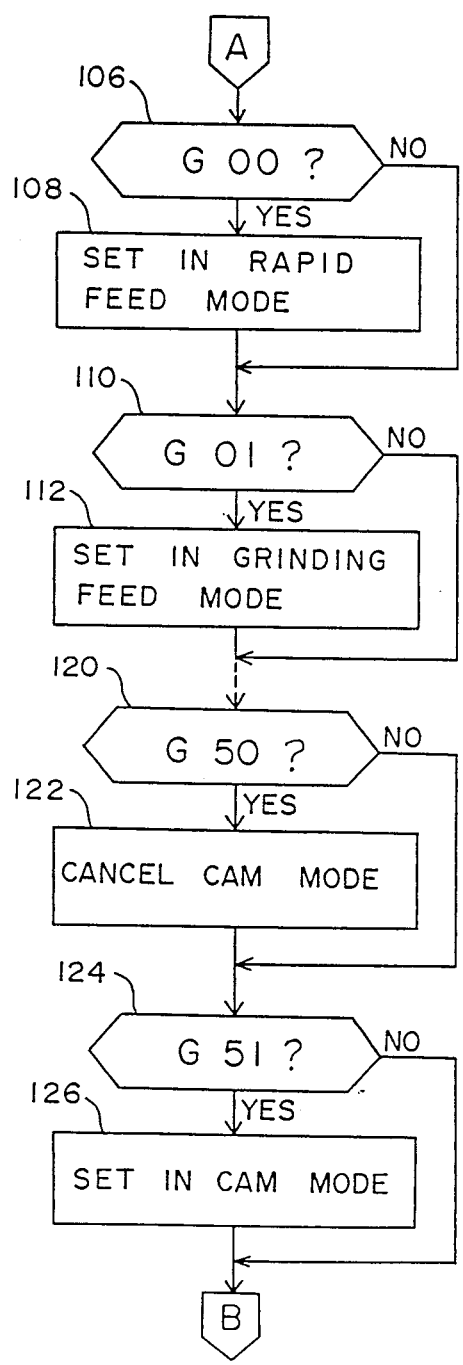

When a start switch on the control panel (not shown) is pushed by the operator, the NC program shown in FIG. 4 is decoded block by block according to the steps specified in the flow chart shown in FIGS. 5(a) and 5(b).

One block of an NC program is read out from the NC program area of the RAM 32 at step 100, and it is ascertained whether or not the data of the block shows the end of the program at step 102. If the data shows completion of the NC program, the execution of this program is ended. But if not, the process of the main CPU 31 is moved to step 104, and it is ascertained whether or not the block includes code G at step 104. If code G is ascertained at step 104, the process of the main CPU 31 is moved to step 106 so as to ascertain the command code in greater detail. In step 106 through step 126, mode flags in the mode setting area 323, 324 of the RAM 32 are set, depending on the detail command code. If code G00 is ascertained at step 106, the flag in the feed mode setting area 323 is set at step 108 so as to set a feed mode in a rapid feed mode. On the other hand, if code G01 is ascertained at step 110, the flag in the feed mode setting area 323 is reset at step 112 so as to set a feed mode in a grinding feed mode. Similarly, if code G50 is ascertained at step 120, the flag in the workpiece mode setting area 324 is reset so as to set the workpiece mode in a regular mode. If code G51 is ascertained at step 124, the flag in the workpiece mode setting area 324 is set to set the workpiece mode in a cam mode.

After the above-mentioned mode setting has occurred, the process of the main CPU 31 is moved to step 132 for certain steps depending on the NC program and mode.

If code X is ascertained at step 130, the process of the main CPU 31 is moved to step 132, and it is ascertained whether or not the workpiece mode is set in the cam mode and the feed mode is set in the grinding feed mode (hereafter referred to as the cam grinding mode). If the mode is the cam grinding mode, pulse distribution for grinding the cam is executed at step 136. If not, a regular pulse distribution, which is not synchronized with main spindle rotation, is executed at step 134.

Since code G00 is programmed in block N010 of the NC program shown in FIG. 4, the feed mode is set in a rapid reed mode at step 108. Then, the grinding wheel G is moved to programmed absolute position X25.0 at step 134 in response to code X25.0 in block N010. By such rapid feed, the grinding point of the grinding wheel G reaches the grinding start point which is distanced 25.0 mm from the main spindle axis.

Afterward, in response to code G51 in block N020, the workpiece mode is set in a cam mode, and one set of the profile data designated by profile number P2345 is selected at step 126. Then the feed mode is set in a grinding feed mode in response to the code G01 in block N030 at step 112, and the cam grinding procedure is completed at step 136 in response to cut-in feed data X22.5. Data with code F in block N030 indicates the feed amount per revolution of the main spindle 13, and data with code R indicates the feed speed per revolution of the main spindle 13.

Figure 7:
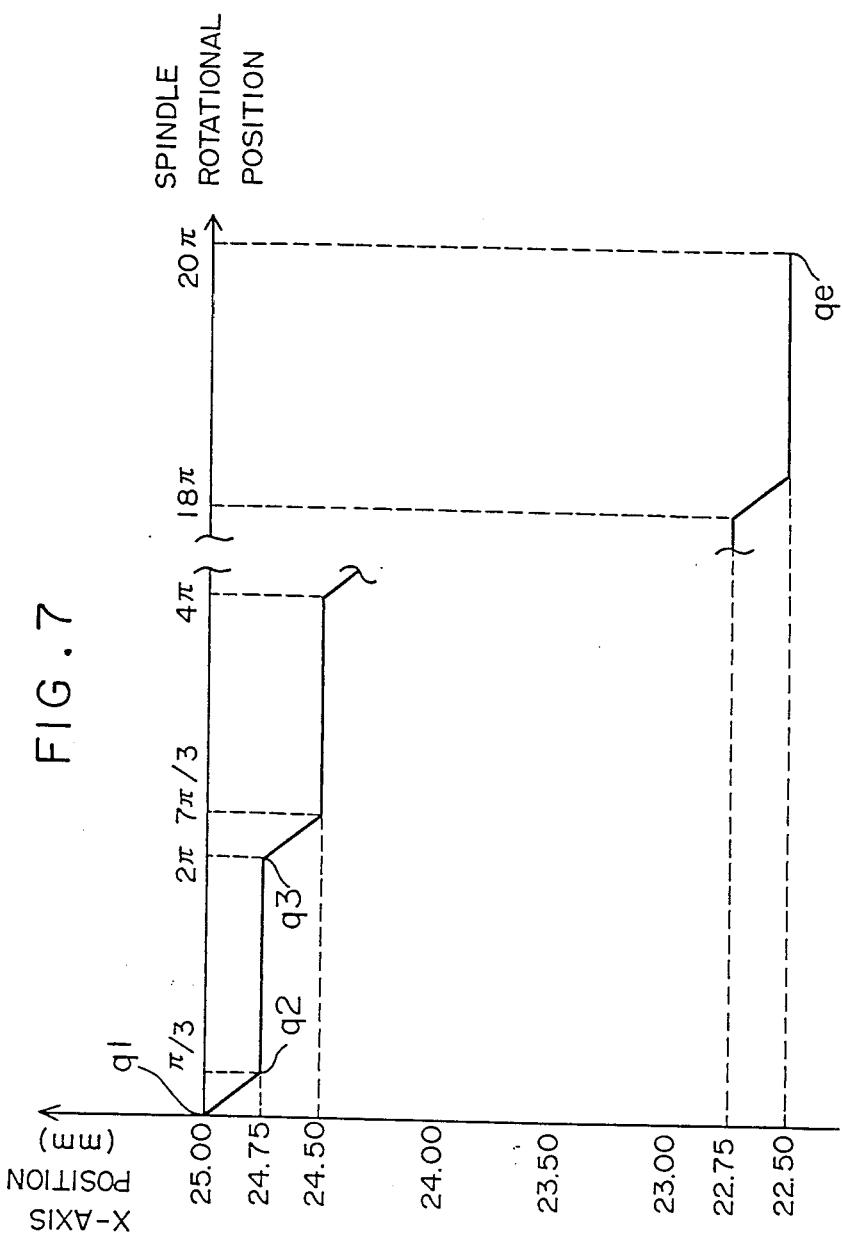
FIG. 7 is an explanatory chart which explains the positional change of the grinding wheel relating to the angle position change of the main spindle.

Accordingly, if F0.25 and R1.5 are programmed as shown in FIG. 4, the grinding wheel G is fed at 0.25 mm per revolution at the speed of 1.5 mm per revolution at the every cut-in feed angle section ($0 \sim \pi/3$, $2\pi \sim 7\pi/3$ ...) as shown in FIG. 7. The main spindle 13 rotates ten revolutions until the total amount of the cut-in feed reaches 2.5 mm.

Figure 6:
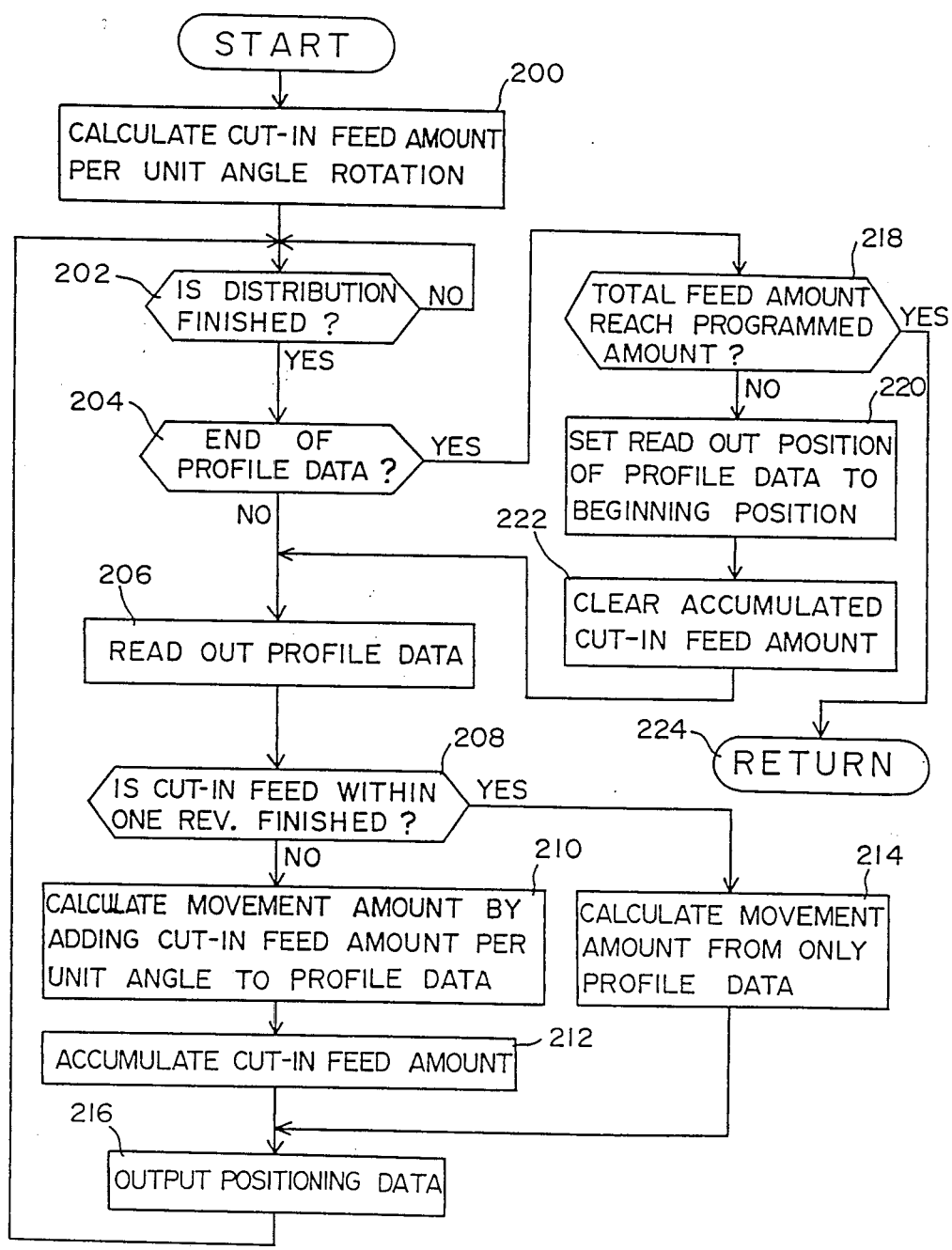
FIG. 6 is a flow chart illustrating the details of step 136 shown in FIG. 5(a)

The cam grinding operation is accomplished by the process at step 136. The details of the process at step 136 are shown in FIG. 6. The process is started at the time when the angle position of the workpiece W reaches the original angle position shown in FIG. 1 where the top portion of the cam C is positioned against grinding wheel G. First, the pulse number corresponding to the cut-in feed amount per unit rotational angle (0.5°) is calculated depending upon the data with code R at step 200.

Afterwards, the pulse distribution finish signal is input at step 202 so as to ascertain whether or not the previous pulse distribution is finished. If the previous pulse distribution is finished, it is ascertained whether or not the data read at the previous cycle is the last data of the profile data at step 204 so as to detect one revolution of the main spindle 13. If the previous data is not the last data of the profile data, the process of the main CPU 31 is moved to step 206, then the next profile data is read out from the profile data area 322 of RAM 32. The profile data consists of movement data of the grinding wheel G at each rotation of 0.5 degree. Then, it is ascertained whether or not the cut-in feed within one revolution is finished or completed at step 208. In this case, this is ascertained by detecting whether or not accumulated cut-in feed amount per unit angle rotation reaches 0.25 mm. If the cut-in feed within one revolution is not finished, the amount of movement data is calculated by adding the cut-in amount per unit angle to profile data at step 210. Then, the cut-in feed amount per unit angle rotation is accumulated at step 212. Afterward, the positioning data is output to the drive CPU 36 at step 216. On the other hand, if the cut-in feed within one revolution is finished, the moving amount is calculated from only the profile data at step 214 and then the positioning data is output at step 216. Afterward, the process of the main CPU 31 is moved back to step 202. If it is ascertained that the data previously read is the last data of the execution profile data at step 204, it is ascertained whether or not the total cut-in feed amount reaches a programmed total feed amount, which is programmed with code at step 218. In this case,this is ascertained by detecting whether or not the grinding point of the grinding wheel G reaches the position where is 22.5 mm far from the main spindle axis. If the total cut-in feed amount dos not reach the programmed amount, the process moves to step 206 via steps 220, 222 so as to execute the above-mentioned process again. At step 220, the read out position of the profile data is set to the beginning position of the profile data so as to produce a series of positioning data in the next rotation cycle. Furthermore, the accumulated cut-in feed amount per unit angle is cleared at step 222. Since accumulated cut-in feed is cleared, the process is moved to step 210 via step 206, 208. Accordingly, cut-in feed of the grinding wheel G is accomplished again. By being repeated in above-mentioned process, the intermittent cut-in feed at the top portion of the cam as shown FIG. 7 is accomplished.

On the other hand, if the total cut-in feed amount reaches the programmed amount, the process for grinding cam according to the NC program in block N030 is finished.

Referring to FIG. 7, it is understood that the cut-in feed is executed during angle section $0 \sim \pi/3$ radian in each rotation of the main spindle 13. In these angle sections, both the profile generating movement and the cut-in feed are executed, and in the rest of angle section, only the profile generating movement is executed. The profile generating movement and the cut-in feed between points q1 and q2 are executed in control cycles which pass the step 210, and the profile generating movement between points q2 and q3 is executed in control cycles which pass the step 214. Furthermore, point q3 corresponding to step 218 and point qe corresponding to the step 224.

As mentioned earlier, since the cut-in feed is executed at the top portion of cam, where the acceleration of profile generating movement becomes a negative value, there is no possibility of deteriorating machining accuracy by executing the cut-in feed.

After the above-mentioned grinding operation is completed, short spark-out grinding is executed so as to eliminate the non-ground portion of the workpiece W.

Obviously, numerous modifications and variations of the present invention are possible in light of the above teachings. It is therefore to be understood that within the scope of the appended claims, the invention may be practiced in a manner other than as specifically described herein.

What is claimed as new and desired to be secured by Letters Patent of the United States is:

1. A method for grinding a non-circular workpiece by profile generating movement of a grinding wheel according to profile data which is calculated from the final shape of said workpiece, and the cut-in feed movement of said grinding wheel according to cut-in feed data, wherein said method comprises the steps of:
    rotating said workpiece;
    moving said grinding wheel by executing simultaneously said profile generating movement of said grinding wheel and said cut-in feed movement of said grinding wheel in a top portion part of each revolution of said workpiece;
    moving said grinding wheel by executing only said profile generation movement of said grinding wheel without cut-in feed in the remaining part of each revolution of said workpiece; and
    repeating said rotating and moving steps until the total cut-in feed amount of said grinding wheel reaches a predetermined value.

2. A method for grinding non-circular workpiece as set forth in claim 1, wherein said cut-in feed movement of said grinding wheel is executed within a part of each revolution of said workpiece, in which the acceleration of said profile generating movement of said grinding wheel becomes zero or a negative value.

3. A method for grinding non-circular workpiece as set forth in claim 2, further comprising:
    moving said grinding wheel by executing only said profile generation movement of said grinding wheel without cut-in feed until said workpiece rotates a predetermined number of revolutions.

* * * * *